US010713455B1

(12) United States Patent
Wang et al.

(10) Patent No.: US 10,713,455 B1
(45) Date of Patent: Jul. 14, 2020

(54) POINT-OF-SALE TERMINAL WITH MIRRORS ARRANGED AROUND SCAN ZONE

(71) Applicant: Toshiba Global Commerce Solutions Holdings Corporation, Tokyo (JP)

(72) Inventors: Chih-Huang Wang, Taipei (TW); Yi-Sheng Lee, Taipei (TW); Wei-Yi Hsuan, Taipei (TW); Te-Chia Tsai, Taipei (TW)

(73) Assignee: Toshiba Global Commerce Solutions, Tokyo (JP)

( * ) Notice: Subject to any disclaimer, the term of this patent is extended or adjusted under 35 U.S.C. 154(b) by 0 days.

(21) Appl. No.: 16/366,947

(22) Filed: Mar. 27, 2019

(51) Int. Cl.
*G06K 19/00* (2006.01)
*G06K 7/10* (2006.01)
*G06Q 20/20* (2012.01)

(52) U.S. Cl.
CPC ..... *G06K 7/10702* (2013.01); *G06K 7/10693* (2013.01); *G06Q 20/208* (2013.01)

(58) Field of Classification Search
USPC ................... 235/435, 439, 454, 462
See application file for complete search history.

(56) References Cited

U.S. PATENT DOCUMENTS

| 7,954,719 | B2 | 6/2011 | Zhu et al. |
| 8,571,298 | B2 | 10/2013 | McQueen et al. |
| 9,305,198 | B2 | 4/2016 | Thompson et al. |
| 9,569,765 | B2 | 2/2017 | Cancro et al. |
| 9,595,029 | B1 | 3/2017 | Catoe et al. |
| 9,600,982 | B2 | 3/2017 | MacIntosh |
| 9,651,363 | B2 | 5/2017 | Gao et al. |
| 9,710,684 | B2 | 7/2017 | Detwiler |
| 10,002,271 | B2 | 6/2018 | Olmstead et al. |
| 2009/0001342 | A1 | 5/2009 | Zhu et al. |

(Continued)

FOREIGN PATENT DOCUMENTS

| WO | 2013039393 A1 | 3/2013 |
| WO | 2017108699 A1 | 6/2017 |
| WO | 2017198754 A1 | 11/2017 |

OTHER PUBLICATIONS

ECR Software Corporation. RAPTOR Accelerated Checkout. https://www.ecrs.com/retail-pos/hardware/accelerated-checkout/. (Accessed: Mar. 18, 2019).

(Continued)

*Primary Examiner* — Matthew Mikels
(74) *Attorney, Agent, or Firm* — Patterson + Sheridan, LLP

(57) ABSTRACT

Embodiments include a method and associated point-of-sale (POS) terminals. The method comprises receiving a receptacle into a stationary position within a scan zone arranged proximately to a surface. The receptacle contains one or more items. The method further comprises acquiring, using a first visual sensor having a predefined disposition relative to the surface, first image information that includes a first view and at least a second view of the scan zone. The second view is provided via a first mirror of one or more mirrors disposed near the surface and arranged around the scan zone. The second view includes a view of the one or more items relative to a surface of the receptacle. The method further comprises identifying, using image analysis of the first image information, the one or more items.

20 Claims, 8 Drawing Sheets

(56) References Cited

U.S. PATENT DOCUMENTS

| | | | |
|---|---|---|---|
| 2010/0102129 A1* | 4/2010 | Drzymala | G06K 7/10712 |
| | | | 235/462.42 |
| 2015/0001094 A1 | 1/2015 | Dhankhar | |
| 2017/0000307 A1 | 1/2017 | Hendrick | |
| 2017/0000838 A1 | 3/2017 | Taira et al. | |
| 2018/0003148 A1 | 1/2018 | Gao et al. | |

OTHER PUBLICATIONS

YI Tunnel CN. "YI Tunnel Redefines Retail @ 2018NRF." YouTube, Jan. 17, 2018, https://www.youtube.com/watch?v=ZAt3gbLfXoY. (Accessed: Mar. 18, 2019).

* cited by examiner

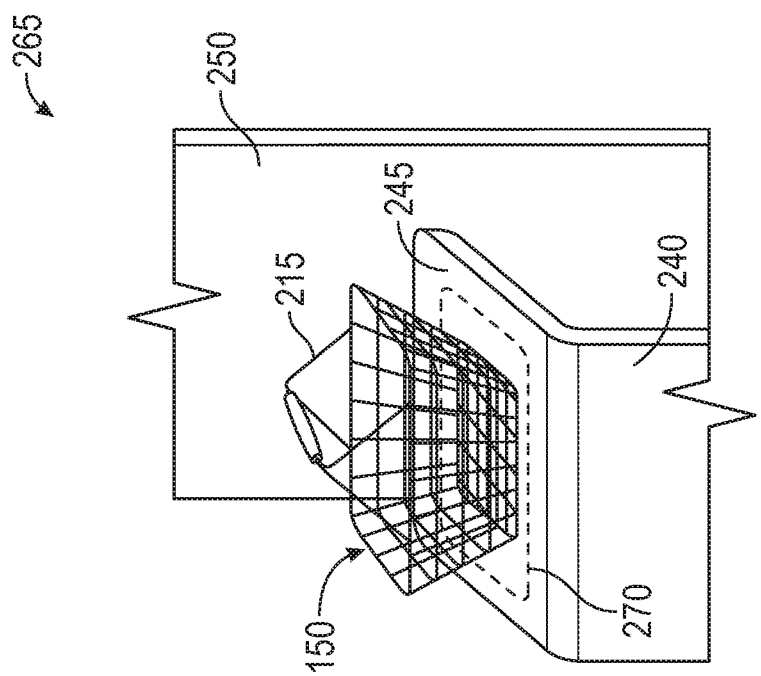
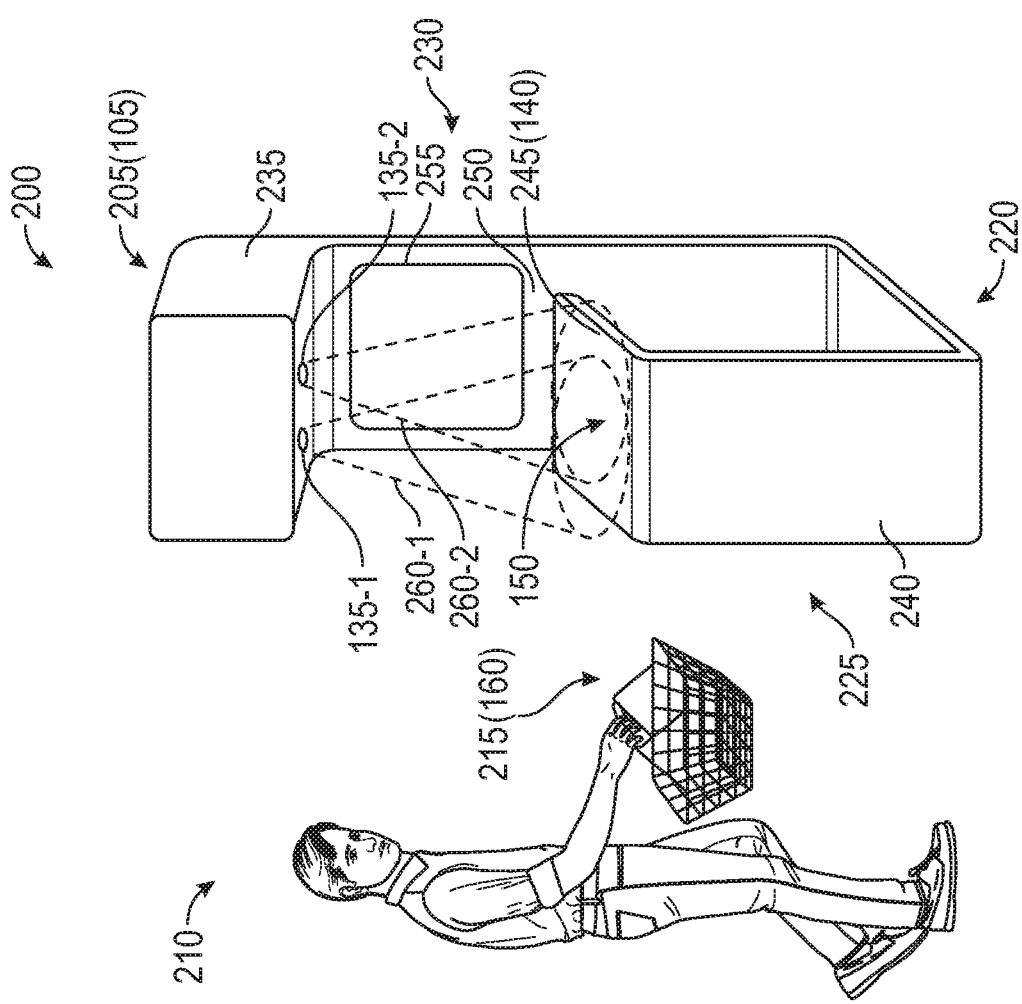
FIG. 2B
FIG. 2A

POINT-OF-SALE TERMINAL WITH MIRRORS ARRANGED AROUND SCAN ZONE

BACKGROUND

The present disclosure relates to point-of-sale (POS) terminals, and more specifically to POS terminals providing a plurality of views of items in a scan zone.

An item recognition rate of a POS terminal is an important metric for streamlining operations within an environment, which can support greater customer throughput and provide an improved customer experience. However, a POS terminal having a single camera providing a single view may support a limited item recognition rate, as items may be partly or fully obscured within the single view. Further, adding more cameras to the POS terminal may be prohibitively costly.

SUMMARY

According to one embodiment, a POS terminal comprises a surface having a predefined scan zone arranged proximately thereto. The scan zone is dimensioned to at least partly receive a receptacle containing one or more items. The POS terminal further comprises a first visual sensor having a predefined disposition relative to the surface. A first field of view of the first visual sensor includes a first view of the scan zone. The POS terminal further comprises one or more mirrors disposed near the surface. The one or more mirrors are arranged around the scan zone to provide at least a second view of the scan zone within the first field of view. When the receptacle is disposed in a stationary position in the scan zone, the second view includes a view of the one or more items relative to a surface of the receptacle. The POS terminal further comprises one or more computer processors configured to identify the one or more items using image analysis of first image information acquired by the first visual sensor.

According to another embodiment, a method comprises receiving a receptacle into a stationary position within a scan zone arranged proximately to a surface. The receptacle contains one or more items. The method further comprises acquiring, using a first visual sensor having a predefined disposition relative to the surface, first image information that includes a first view and at least a second view of the scan zone. The second view is provided via a first mirror of one or more mirrors disposed near the surface and arranged around the scan zone. The second view includes a view of the one or more items relative to a surface of the receptacle. The method further comprises identifying, using image analysis of the first image information, the one or more items.

According to another embodiment, a POS terminal comprises a surface, and a visual sensor arranged in a position above the surface. A field of view of the visual sensor includes a top view of a scan zone arranged proximate to the surface. The scan zone is dimensioned to receive a receptacle containing one or more items. The POS terminal further comprises one or more mirrors attached to the surface. The one or more mirrors are arranged around the scan zone to provide a plurality of lateral views of the scan zone within the field of view. When the receptacle is disposed in a stationary position in the scan zone, the plurality of lateral views includes views of the one or more items through an exterior surface of the receptacle. The POS terminal further comprises one or more computer processors configured to identify the one or more items using image analysis of image information acquired by the visual sensor.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

FIGS. 2A and 2B illustrate placing a receptacle at a POS terminal, according to one or more embodiments.

DETAILED DESCRIPTION

Aspects of the current disclosure relate to a point-of-sale (POS) terminal comprising a surface having a predefined scan zone arranged proximately thereto. The scan zone is dimensioned to at least partly receive a receptacle containing one or more items. The POS terminal further comprises a first visual sensor having a predefined disposition relative to the surface. A first field of view of the first visual sensor includes a first view of the scan zone. The POS terminal further comprises one or more mirrors disposed near the surface. The one or more mirrors are arranged around the scan zone to provide at least a second view of the scan zone within the first field of view. When the receptacle is disposed in a stationary position in the scan zone, the second view includes a view of the one or more items relative to a surface of the receptacle. The POS terminal further comprises one or more computer processors configured to identify the one or more items using image analysis of first image information acquired by the first visual sensor.

In some embodiments, the second view includes a view of the one or more items through an exterior surface of the receptacle. The receptacle may include one or more openings that extend through the exterior surface, and/or may be formed of a substantially optically transmissive material. In other embodiments, the one or more mirrors are disposed at an interior surface of the receptacle.

Beneficially, the plurality of views of the one or more items enables an increased item recognition rate by the POS terminal, which supports greater customer throughput and provides an improved customer experience. While features of the POS terminal are generally discussed within the context of a shopping environment, such as a retail store, it is contemplated that the techniques disclosed herein may be applied to other environments (some non-limiting examples include libraries, museums, classrooms, hospitals, etc.) to provide an adaptive experience for persons included therein.

Figure 1:
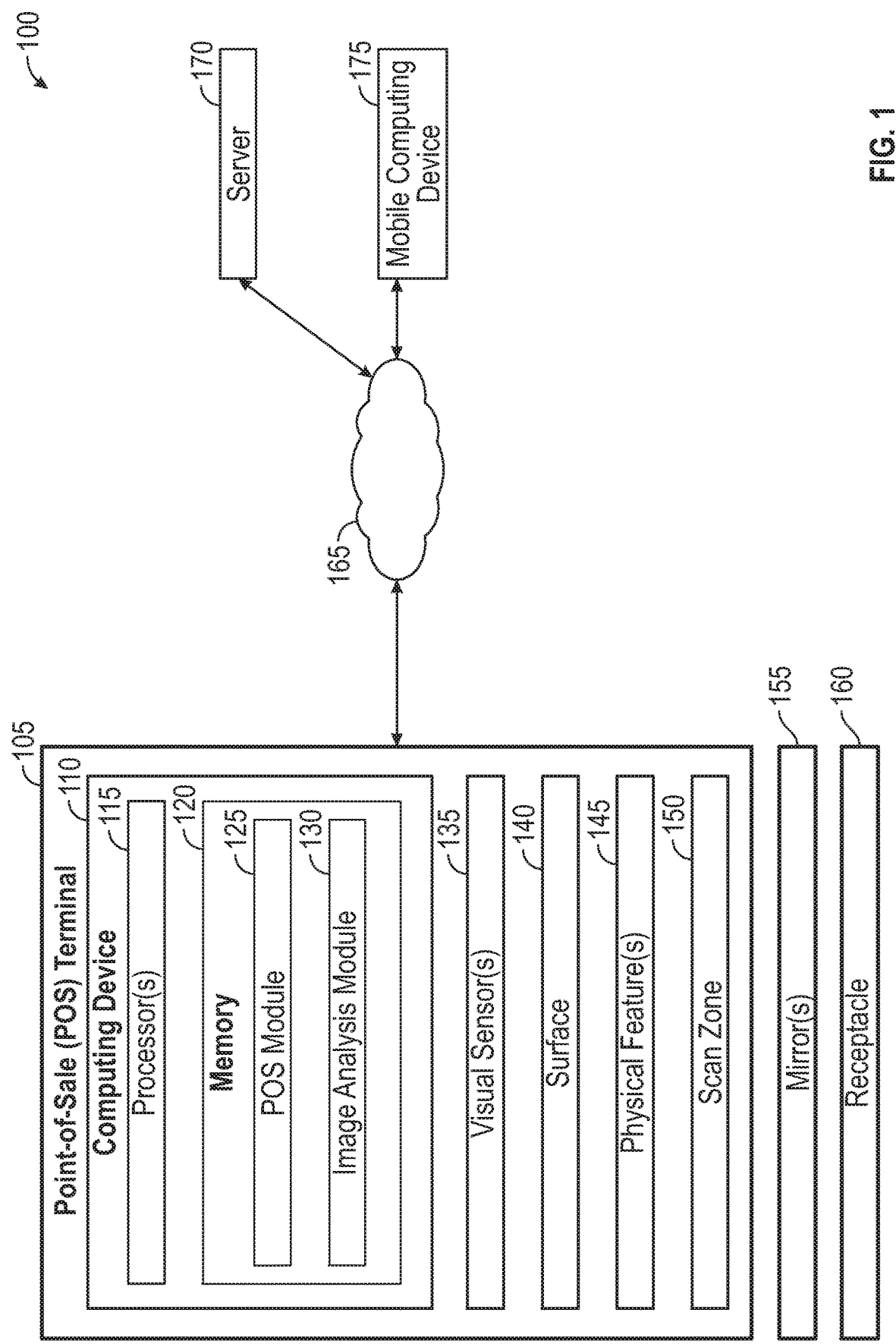
FIG. 1 is an exemplary system having a point-of-sale (POS) terminal, according to one or more embodiments.

FIG. 1 is an exemplary system 100 having a point-of-sale (POS) terminal 105, according to one or more embodiments. The POS terminal 105 may be implemented with any suitable form. In some embodiments, the POS terminal 105 is implemented as a standalone terminal (e.g., a kiosk) disposed within an environment. In other embodiments, the POS terminal 105 is integrated with one or more other structures in the environment, e.g., a conveyor system. The POS terminal 105 may have a fixed positioning in the environment or may be movable.

The POS terminal 105 comprises a computing device 110 implemented with any suitable form. Some non-limiting examples of the computing device 110 include a standalone computing device (e.g., a desktop computer) housed within the POS terminal 105, and an integrated computing device (e.g., a tablet computer having an external interface). The computing device 110 comprises one or more computer processors 115 and a memory 120. The one or more computer processors 115 may be implemented in any suitable form, such as a general purpose microprocessor, a controller, an application-specific integrated circuit (ASIC), and so forth. The memory 120 of the computing device 110 may include a variety of computer-readable media selected for their size, relative performance, or other capabilities: volatile and/or non-volatile media, removable and/or non-removable media, etc.

The memory 120 may include one or more modules for performing various functions described herein. In one embodiment, each module includes program code that is executable by the one or more computer processors 115. However, other embodiments may include modules that are partially or fully implemented in hardware (i.e., circuitry) or firmware of the computing device 110.

As shown, the memory 120 comprises a POS module 125 that is configured to perform functions related to the administration of the environment, and an image analysis module 130 configured to perform image analysis of image information acquired by one or more visual sensors 135 of the POS terminal 105. In some embodiments, the image analysis module 130 identifies one or more items contained in a receptacle 160 (e.g., selected by a customer) using any suitable object recognition techniques. In some embodiments, the POS module 125 is configured to complete sale transactions by calculating a cost of the identified one or more items, accepting payment from the customer, updating an inventory system, and so forth. The POS module 125 may provide additional functionality, such as providing interactive assistance to the customer, requesting employee assistance for the customer, performing an audit of the transaction, and so forth. Further, while discussed primarily in terms of sale transactions, other types of transactions are also contemplated.

The computing device 110 is communicatively coupled with a server 170 and a mobile computing device 175 via a network 165. The network 165 represents one or more networks of various types, which may include a local area or local access network (LAN), a general wide area network (WAN), and/or a public network (e.g., the Internet). The server 170 comprises computer hardware, e.g., one or more computer processors and a memory, that manages the administration of the environment. In some embodiments, the server 170 communicates with the POS module 125 of a POS terminal 105 (or multiple POS terminals 105), an inventory system, and so forth.

The mobile computing device 175 comprises computer hardware in any suitable implementation, such as a smartphone, a tablet computing device, a body-wearable computing device, and so forth. Within the example context of a shopping environment, the mobile computing device 175 may be a personal device possessed by the customer, or may be possessed by an employee. In some embodiments, the mobile computing device 175 communicates with the POS terminal 105 and/or the server 170 to provide an improved experience for a customer or an employee. In one example, the mobile computing device 175 may be used by a customer to present a form of payment when completing a sale transaction. In another example, the mobile computing device 175 may be used to prompt a customer to identify one or more items to be included in the sale transaction (e.g., to identify an item that is not successfully visually identified by the POS terminal 105). In yet another example, the mobile computing device 175 may be to direct an employee to provide assistance to a customer at the POS terminal 105.

The POS terminal 105 further comprises one or more visual sensors 135, and a surface 140. The one or more visual sensors 135 may have any suitable implementation, such as a visual camera or an infrared camera. The one or more visual sensors 135 have a predefined disposition relative to the surface 140.

The surface 140 may have any configuration that is suitable for receiving a receptacle 160 containing one or more items. In some embodiments, the surface 140 comprises a flat (i.e., planar) surface, upon which the receptacle 160 may be placed in a contacting relationship. For example, the surface 140 may be an elevated surface, or may be a floor-level surface.

In some embodiments, the POS terminal 105 further comprises one or more physical features 145 that are defined relative to the surface 140 and are arranged to dispose the receptacle 160 in a stationary position. In one example, the one or more physical features 145 comprise an opening formed in the surface 140, where the opening is dimensioned to at least partly receive the receptacle 160. In another example, the one or more physical features 145 comprise one or more projecting features (e.g., projecting from the surface 140) that are dimensioned and/or arranged to limit the movement of the receptacle 160.

The receptacle 160 may have any suitable implementation for permitting the POS terminal 105 to acquire multiple views of the one or more items contained in the receptacle 160. In some embodiments, the receptacle 160 is hand-carried or shoulder-carried by a person. Some examples of the hand-carried or shoulder-carried receptacle 160 include shopping baskets, reusable shopping bags (whether rigid or soft-sided), string bags, and plastic bags. In other embodiments, the receptacle 160 is pushed or otherwise manipulated by the person. One example of the pushed receptacle 160 includes a shopping cart.

In some embodiments, the multiple views of the one or more items comprise a top view, one or more lateral views, and/or a bottom view of the receptacle 160. In some embodiments, the multiple views comprise view(s) of the one or more items through an exterior surface of the receptacle 160.

In some embodiments, one or more openings may extend through exterior surfaces (or exterior walls) of the receptacle 160, and the one or more openings are dimensioned and/or arranged to permit the one or more visual sensors 135 to view the one or more items therethrough. Some non-limiting examples of the receptacle 160 include a wire basket, and a basket formed of a non-optically transmissive material (e.g., a translucent or opaque plastic) with openings extending through sidewalls of the basket.

In some embodiments, the receptacle 160 is formed of a substantially optically transmissive material, such as glass or plastic (e.g., polyethlylene (PET), polyvinyl chloride (PVC), acrylic), such that the one or more visual sensors 135 may view the one or more items through the exterior walls of the receptacle 160.

In some embodiments, the receptacle 160 includes a combination of the one or more openings and the substantially optically transmissive material. In one example, the receptacle 160 is a shopping basket having a clear plastic grid, such that the one or more items are viewable through the one or more openings and through the clear plastic grid. In another example, the receptacle is an opaque shopping basket with a clear plastic panel or grid arranged in the one or more openings.

Each of the one or more visual sensors 135 has a corresponding field of view. In some embodiments, the one or more visual sensors 135 have a fixed orientation corresponding to fixed field(s) of view. In other embodiments, the one or more visual sensors 135 have an adjustable orientation corresponding to adjustable field(s) of view. Generally, the one or more visual sensors 135 are oriented toward the surface 140, and a scan zone 150 defined proximate to the surface 140 is defined by the field(s) of view of the one or more visual sensors 135. In some embodiments, the scan zone 150 corresponds to a single field of view of a single visual sensor 135. In other embodiments, the scan zone 150 corresponds to multiple fields of view that may be substantially overlapping, partly overlapping, or non-overlapping.

The scan zone 150 is dimensioned to at least partly receive the receptacle 160. In this way, when the receptacle 160 is disposed in a stationary position in the scan zone 150, the one or more items contained in the receptacle 160 are disposed within the field(s) of view of the one or more visual sensors 135.

In some embodiments, the POS terminal 105 comprises one or more mirrors 155 that are arranged around the scan zone 150. The configuration of the one or mirrors 155 and the receptacle 160 is such that a view of the one or more items relative to a surface of the receptacle 160 is provided in the field(s) of view of the one or more visual sensor 135. In some embodiments, the field(s) of view of the one or more visual sensors 135 include a top view of the receptacle 160, and the one or more mirrors 155 are angled such that the field(s) of view of the one or more visual sensors 135 also include one or more lateral views and/or one or more bottom views of the one or more items contained in the receptacle 160.

Although not shown, the POS terminal 105 may include one or more input devices and/or one or more output devices that are communicatively coupled with the one or more computer processors 115 of the computing device 110. The one or more input devices and/or the one or more output devices may provide improved interaction of the POS terminal 105 with a customer, an employee, and so forth. Some examples of the one or more input devices include touchscreens, keyboards, buttons, microphones, and so forth. Some examples of the one or more output devices include visual displays (e.g., a display panel using any suitable display technology), speakers or other audio devices, haptic devices, and so forth.

FIGS. 2A and 2B illustrate placing a receptacle at a POS terminal, according to one or more embodiments. The features illustrated in diagrams 200, 265 may be used in conjunction with other embodiments.

The diagram 200 represents a portion of a shopping environment, in which a customer 210 approaches a standalone POS terminal 205 (one example of the POS terminal 105 of FIG. 1). The customer 210 is carrying a shopping basket 215 (one example of the receptacle 160 of FIG. 1) with one or more items contained therein.

The standalone POS terminal 205 comprises a base 220 that contacts the floor, as well as an arm 225 and a back 230 that extend from the base 220. As shown, the arm 225 and the back 230 extend in a substantially vertical direction from a substantially horizontal base 220, but other configurations are also possible.

The arm 225 comprises a front portion 240 that extends in a substantially vertical direction from the base 220, and a surface 245 (one example of the surface 140 of FIG. 1) that extends from the front portion 240 in a substantially horizontal direction.

A top portion 235 extends from the back 230 in a substantially horizontal direction, and overlaps with the surface 245 and the base 220. Two visual sensors 135-1, 135-2 are disposed in the top portion 235 and oriented in a downward direction toward the surface 245. Other implementations of the standalone POS terminal 205 may have different numbers of visual sensors (e.g., a single visual sensor) and/or different orientations of the visual sensors.

The visual sensor 135-1 has a first field of view 260-1, and the visual sensor 135-2 has a second field of view 260-2. As shown, the first field of view 260-1 and the second field of view 260-2 are substantially overlapping. The scan zone 150 is arranged proximately to the surface 245, and is within the first field of view 260-1 and the second field of view 260-2. Although not shown for clarity, one or more mirrors are disposed near the surface 245 and are arranged around the scan zone 150.

A visual display 255 is arranged at a surface 250 of the back 230. In some embodiments, the visual display 255 may be operated to present information to the customer 210 before, during, and/or after the sale transaction at the standalone POS terminal 205.

The diagram 265 illustrates a portion of the standalone POS terminal 205, in which the shopping basket 215 has been placed by the customer 210 within the scan zone 150. As shown, a bottom surface of the shopping basket 215 contacts the surface 245 within a region 270.

Figure 3:
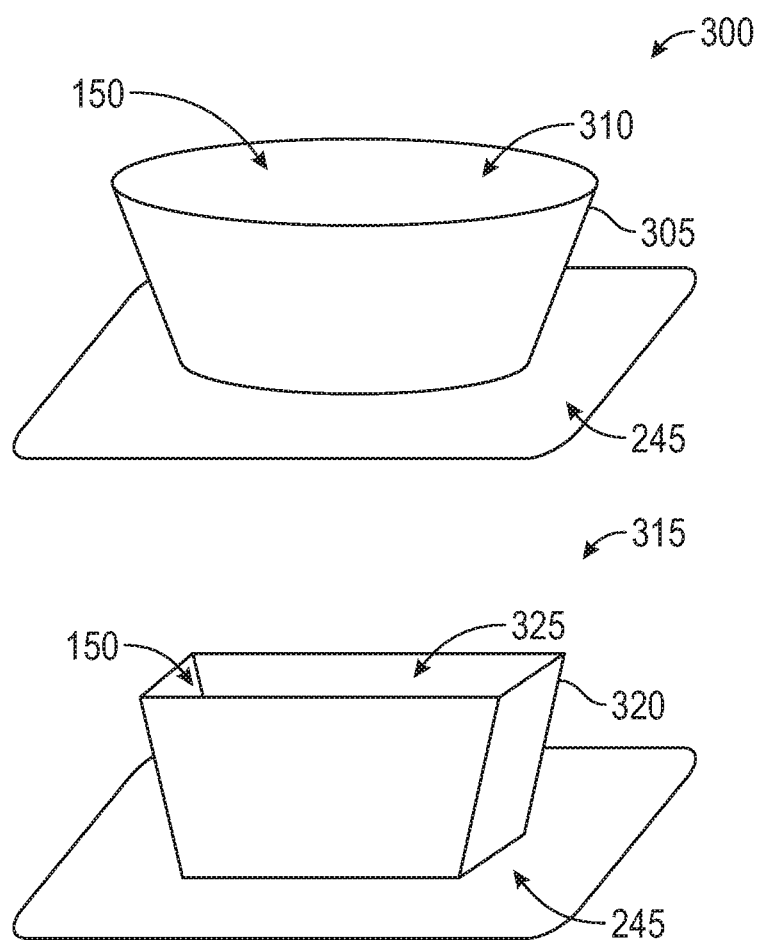
FIG. 3 illustrates exemplary configurations of one or more mirrors, according to one or more embodiments.

FIG. 3 illustrates exemplary configurations of one or more mirrors, according to one or more embodiments. The features illustrated in diagrams 300, 315 may be used in conjunction with other embodiments. For example, the one or more mirrors may be employed with the standalone POS terminal 205 of FIG. 2.

In the diagram 300, a single mirror 305 is disposed at the surface 245. In some embodiments, the single mirror 305 is rigidly attached to (or integrated with) the surface 245. The single mirror 305 has a frustoconical shape and completely circumscribes the scan zone 150. A receptacle, such as a shopping basket, may be inserted into the scan zone 150 through an upper opening 310 defined by the single mirror 305. Once inserted into the scan zone 150, the receptacle rests in a stationary position on the surface 245.

In the diagram 315, a single mirror 320 is disposed at the surface 245. The single mirror 320 has a frustopyramidal shape and completely circumscribes the scan zone 150. The receptacle may be inserted through an upper opening 325 defined by the single mirror 320. Once inserted into the scan zone 150, the receptacle rests in a stationary position on the surface 245.

In some embodiments, the sidewalls of the single mirrors 305, 320 are angled such that the field(s) of view of one or more visual sensors (e.g., disposed above the single mirrors 305, 320 and the surface 245) also include one or more lateral views and/or one or more bottom views of the one or more items contained in the receptacle.

The sidewalls of the single mirrors 305, 320 may be angled such that the single mirrors 305, 320 provide one or more lateral views of the one or more items contained by the receptacle onto a field of view of the one or more visual sensors. In some embodiments, the surface 245 comprises a mirrored surface, but this is not a requirement. In this case, the sidewalls of the single mirrors 305, 320 may be angled such that the mirrored surface (also) provides a bottom view of the one or more items into a field of view of the one or more visual sensors.

Other implementations of the one or more mirrors are also contemplated. In one example, the one or more mirrors comprise a plurality of mirrors that collectively circumscribe the scan zone 150. The mirrors of the plurality of mirrors may be continuous or may be spaced apart from each other. In another example, the one or more mirrors only partly circumscribe the scan zone 150. For example, a section of the single mirrors 305, 320 may be omitted, which can ease insertion and removal of the receptacle into and the scan zone 150.

Figure 4A:
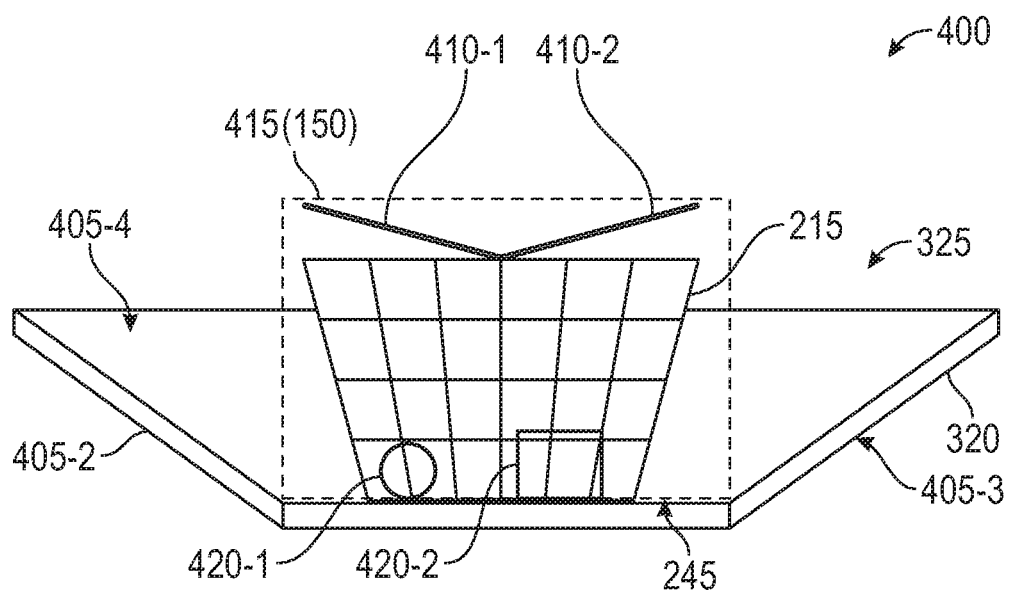
FIG. 4A is a cross-section view of a receptacle in a stationary position in a scan zone, according to one or more embodiments.
Figure 4B:
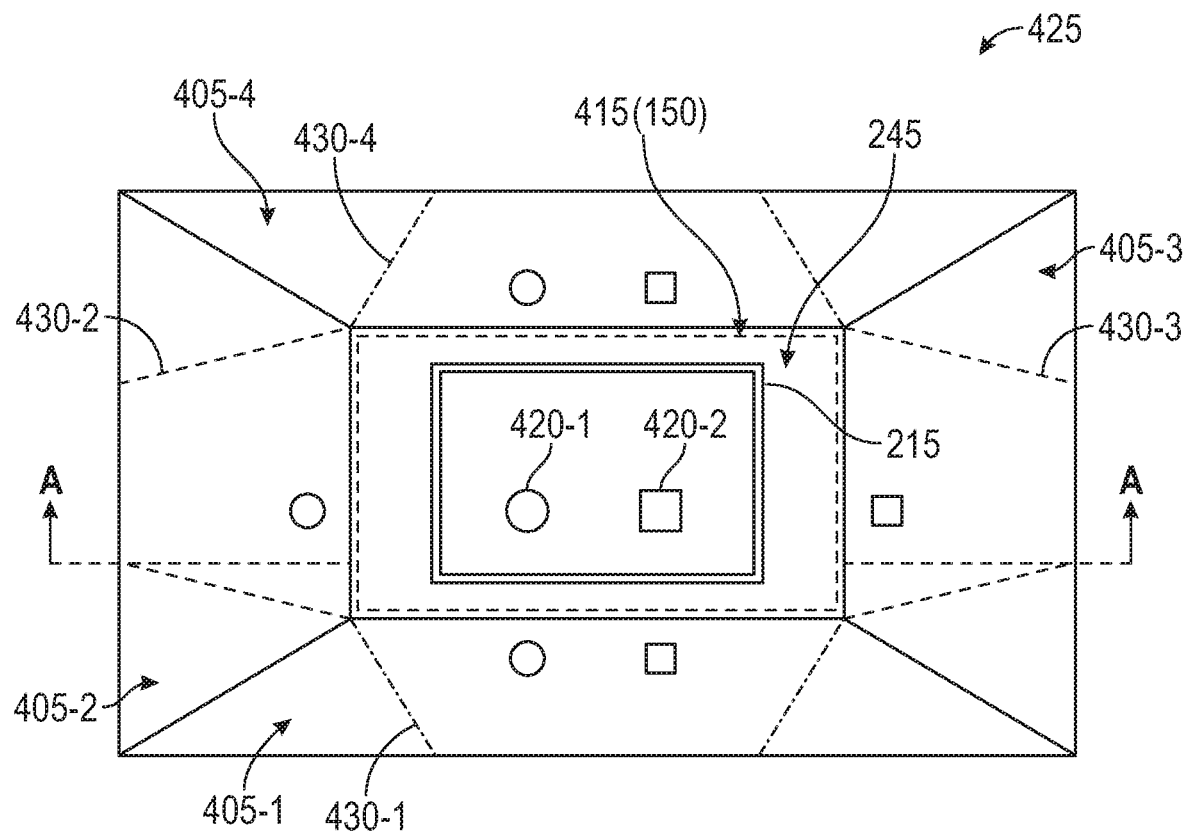
FIG. 4B is a top view of a receptacle in a stationary position in a scan zone, according to one or more embodiments.

FIG. 4A is a cross-section view 400 of a receptacle in a stationary position in a scan zone 415, according to one or more embodiments. FIG. 4B is a top view 425 of the receptacle in the stationary position. The cross-section view 400 is along section A-A depicted in the top view 425. The features illustrated in the cross-section view 400 and the top view 425 may be used in conjunction with other embodiments.

The shopping basket 215 is disposed in the scan zone 415 (representing one example of the scan zone 150 of FIG. 1). A bottom of the shopping basket 215 contacts the surface 245. The shopping basket 215 includes adjustable handles 410-1, 410-2 and contains items 420-1, 420-2.

The single mirror 320 circumscribes the scan zone 415. The single mirror 320 comprises mirrored surfaces 405-1, 405-2, 405-3, 405-4 that respectively provide lateral views 430-1, 430-2, 430-3, 430-4 of the scan zone 415. Each of the items 420-1, 420-2 is obscured from certain angles or perspectives. For example, the item 420-2 is obscured by the item 420-1 in the lateral view 430-2, and the item 420-1 is obscured by the item 420-2 in the lateral view 430-3.

As few as a single visual sensor may be disposed above the shopping basket 215 in the stationary position in the scan zone 415, which acquires image information of at least a first view and a second view of the scan zone. For example, the image information may include a top view of the scan zone 415 and a plurality of lateral views of the scan zone 415, and the plurality of lateral views includes views of the items 420-1, 420-2 through an exterior surface of the shopping basket 215.

A computing device coupled with the visual sensor is configured to identify the items 420-1, 420-2 using image analysis of the image information. In some embodiments, the items 420-1, 420-2 have some distortion in the lateral views 430-1, 430-2, 430-3, 430-4, and the image analysis comprises correcting the distortion (e.g., reorienting and/or reshaping portions of the image information corresponding to the lateral views 430-1, 430-2, 430-3, 430-4).

As shown, the single mirror 320 is a continuous mirror circumscribing the scan zone 415. However, in other embodiments the single mirror 320 only partly circumscribes the scan zone 415. For example, the mirrored surface 405-1 could be omitted from the single mirror 320, such that the shopping basket 215 may be inserted to and/or removed from the scan zone 415 through the opening defined between the mirrored surfaces 405-2, 405-3. In other embodiments, the one or more mirrors comprise a plurality of mirrors. For example, one or more of the mirror surfaces 405-1, 405-2, 405-3, 405-4 may be separated from each other.

Other arrangements of the one or more mirrors are also possible, such as greater or fewer numbers of the mirrored surfaces, different shapes of the mirrored surfaces, and so forth. For example, one or more of the mirrored surfaces 405-1, 405-2, 405-3, 405-4 may include a concave portion that is configured to "stretch" the corresponding lateral views 430-1, 430-2, 430-3, 430-4 within the field of view of the visual sensor.

Figure 5A:
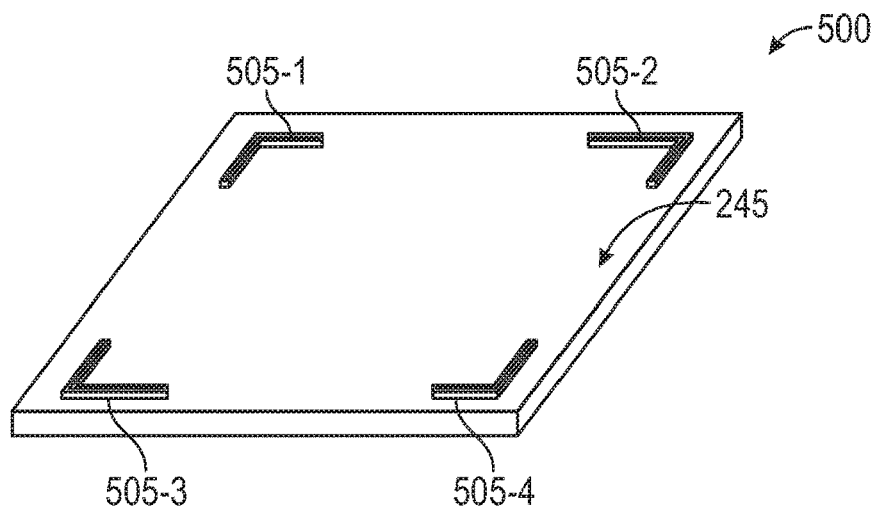
FIGS. 5A and 5B illustrate one or more physical features defined relative to a surface of a POS terminal, according to one or more embodiments.
Figure 5B:
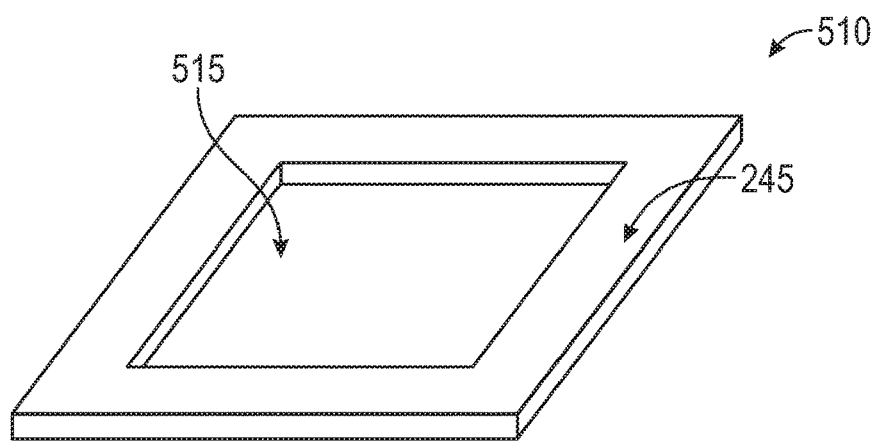

FIGS. 5A and 5B illustrate one or more physical features defined relative to a surface of a POS terminal, according to one or more embodiments. The one or more physical features are defined relative to the surface and are arranged to dispose and/or retain the receptacle in the stationary position. The features illustrated in diagrams 500, 510 may be used in conjunction with other embodiments, such as with the one or more mirrored surfaces 405-1, 405-2, 405-3, 405-4 of FIGS. 4A and 4B.

In the diagram 500, the one or more physical features comprise a plurality of projecting features 505-1, 505-2, 505-3, 505-4 projecting outward from the surface 245. In some embodiments, the plurality of projecting features 505-1, 505-2, 505-3, 505-4 may be received in corresponding openings formed in the receptacle (e.g., relative to a bottom surface of the receptacle) to dispose the receptacle in the stationary position. In other embodiments, the plurality of projecting features 505-1, 505-2, 505-3, 505-4 is arranged to circumscribe the bottom surface of the receptacle, such that when the receptacle contacts the surface 245 within the plurality of projecting features 505-1, 505-2, 505-3, 505-4, the receptacle is retained in the stationary position by the plurality of projecting features 505-1, 505-2, 505-3, 505-4 or is permitted to slide a predetermined amount before engaging one or more of the plurality of projecting features 505-1, 505-2, 505-3, 505-4.

Figure 5C:
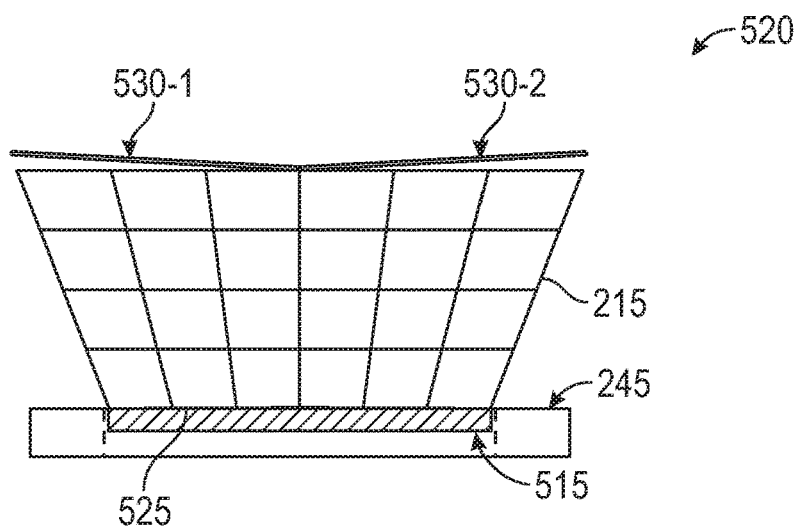
FIG. 5C illustrates receiving a receptacle partly into an opening formed in a surface of a POS terminal, according to one or more embodiments.

In the diagram 510, the one or more physical features comprise an opening 515 extending at least partway through the surface 245. In some embodiments, the opening 515 extends entirely through the surface 245. The receptacle may be received partly or fully into the opening 515 to dispose the receptacle in the stationary position. For example, diagram 520 of FIG. 5C illustrates receiving a shopping basket 215 partly into the opening 515 formed in the surface 245. As shown, the shopping basket 215 comprises handles 530-1, 530-2, and a base portion 525 of the shopping basket 215 is dimensioned to be received into the opening 515. In other embodiments, multiple openings may be formed into the surface 245 that are dimensioned and arranged to receive projecting portions of the shopping basket 215 (e.g., tabs extending from the bottom surface of the shopping basket).

Figure 6A:
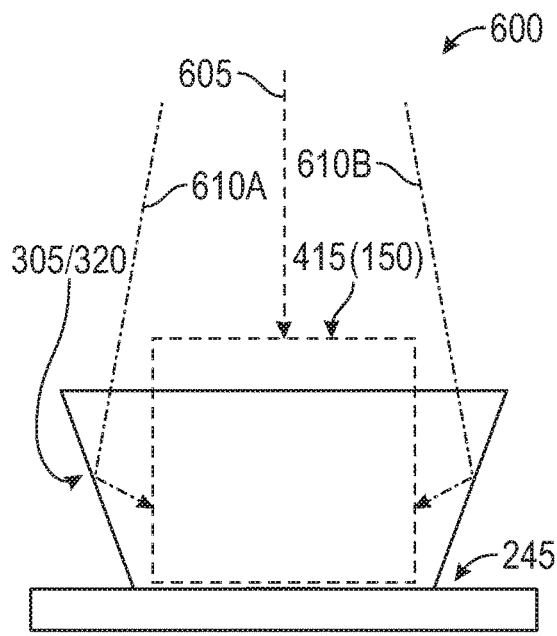
FIGS. 6A and 6B illustrate cross-section views of exemplary configurations of one or more mirrors relative to a surface of a POS terminal, according to one or more embodiments.
Figure 6B:
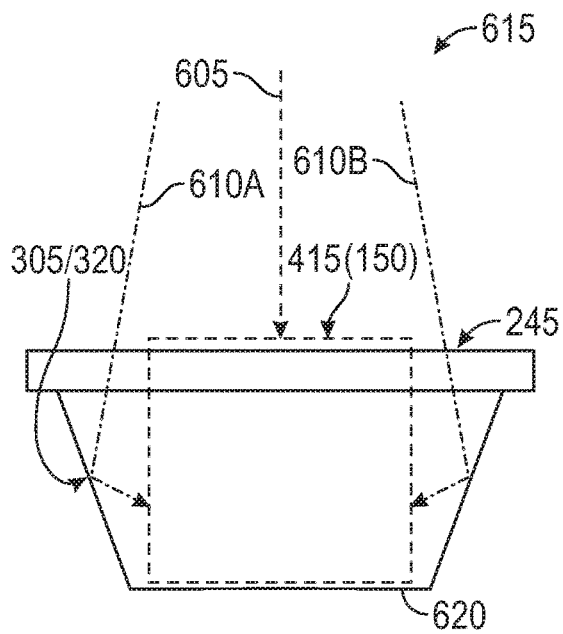

FIGS. 6A and 6B illustrate cross-section views 600, 615 of exemplary configurations of one or more mirrors 305, 320 relative to a surface 245 of a POS terminal, according to one or more embodiments. More specifically, the cross-section view 600 depicts the single mirror 305 or the single mirror 320 arranged above the surface 245. In some embodiments, the one or more mirrors 305, 320 are rigidly attached to the surface 245 (e.g., using fasteners and/or adhesives). Using the one or more mirrors 305, 320, a single visual sensor disposed above the one or more mirrors 305, 320 is configured to acquire a top view 605 of the scan zone 415, and a plurality of lateral views 610A, 610B of the scan zone 415.

The cross-section view 615 depicts the single mirror 305 or single mirror 320 arranged beneath the surface 245. In some embodiments, the one or more mirrors 305, 320 are rigidly attached to the surface 245 (e.g., using fasteners and/or adhesives). To arrange the receptacle in the scan zone 415, the receptacle is inserted partly or fully through an opening in the surface 245 and may contact a bottom surface 620 beneath the surface 245. In some embodiments, the bottom surface 620 is a mirrored surface and is arranged to provide a bottom view of the scan zone 415. For example, the bottom surface 620 may be angled to provide the bottom view to the visual sensor directly or via another mirrored surface.

Figure 7A:
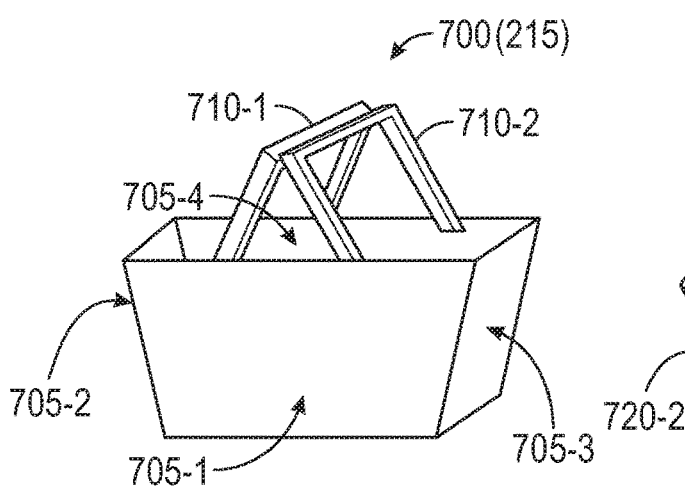
FIGS. 7A and 7B illustrate exemplary configurations of receptacles, according to one or more embodiments.
Figure 7B:
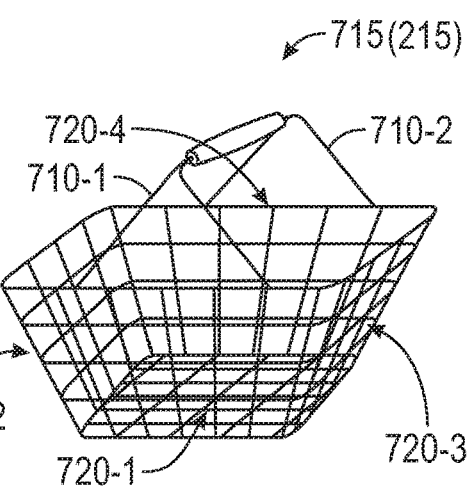

FIGS. 7A and 7B illustrate exemplary configurations of receptacles, according to one or more embodiments. In FIG. 7A, a shopping basket 700 (one example of the shopping basket 215) comprises a plurality of exterior surfaces 705-1, 705-2, 705-3, 705-4 and handles 710-1, 710-2. The plurality of exterior surfaces 705-1, 705-2, 705-3, 705-4 is formed of a substantially optically transmissive material, such that at least a portion of the scan zone is viewable through the plurality of exterior surfaces 705-1, 705-2, 705-3, 705-4. Some non-limiting examples of the substantially optically transmissive material include glass and plastic (e.g., polyethylene (PET), polyvinyl chloride (PVC), acrylic).

In FIG. 7B, a shopping basket 715 (one example of the shopping basket 215) comprises a plurality of exterior surfaces 720-1, 720-2, 720-3, 720-4 and handles 710-1, 710-2. One or more openings extend through the plurality of exterior surfaces 720-1, 720-2, 720-3, 720-4 and the one or more openings are dimensioned and/or arranged such that at least a portion of the scan zone is viewable through the plurality of exterior surfaces 720-1, 720-2, 720-3, 720-4. In some embodiments, the shopping basket 715 comprises a non-optically transmissive material, e.g., a wire basket or an translucent or opaque plastic basket.

Figure 8:
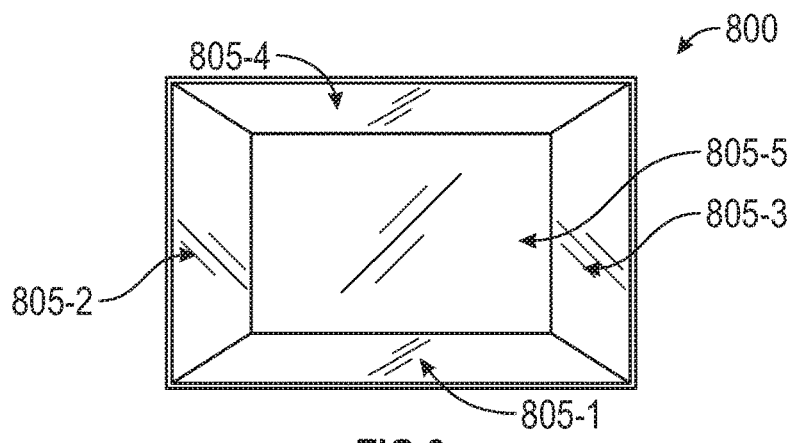
FIG. 8 illustrates a receptacle with one or more mirrors disposed at an interior surface, according to one or more embodiments.

FIG. 8 illustrates a receptacle with one or more mirrors disposed at an interior surface, according to one or more embodiments. More specifically, FIG. 8 illustrates a top view of a shopping basket 800 (one example of the shopping basket 215) comprising a plurality of interior surfaces 805-1, 805-2, 805-3, 805-4, 805-5. The interior surfaces 805-1, 805-2, 805-3, 805-4 are sidewalls of the shopping basket 800, while the interior surface 805-5 is a bottom surface of the shopping basket 800. In some embodiments, one or more of the plurality of interior surfaces 805-1, 805-2, 805-3, 805-4, 805-5 comprise mirrored surfaces. For example, a reflective film such as biaxially-oriented polyethylene terephthalate (or "BoPET") may be applied to the plurality of interior surfaces 805-1, 805-2, 805-3, 805-4, 805-5. In this way, when the shopping basket 800 is disposed in a stationary position in a scan zone, the plurality of interior surfaces 805-1, 805-2, 805-3, 805-4, 805-5 may provide additional views (e.g., lateral views) of the scan zone to a visual sensor.

Figure 9:
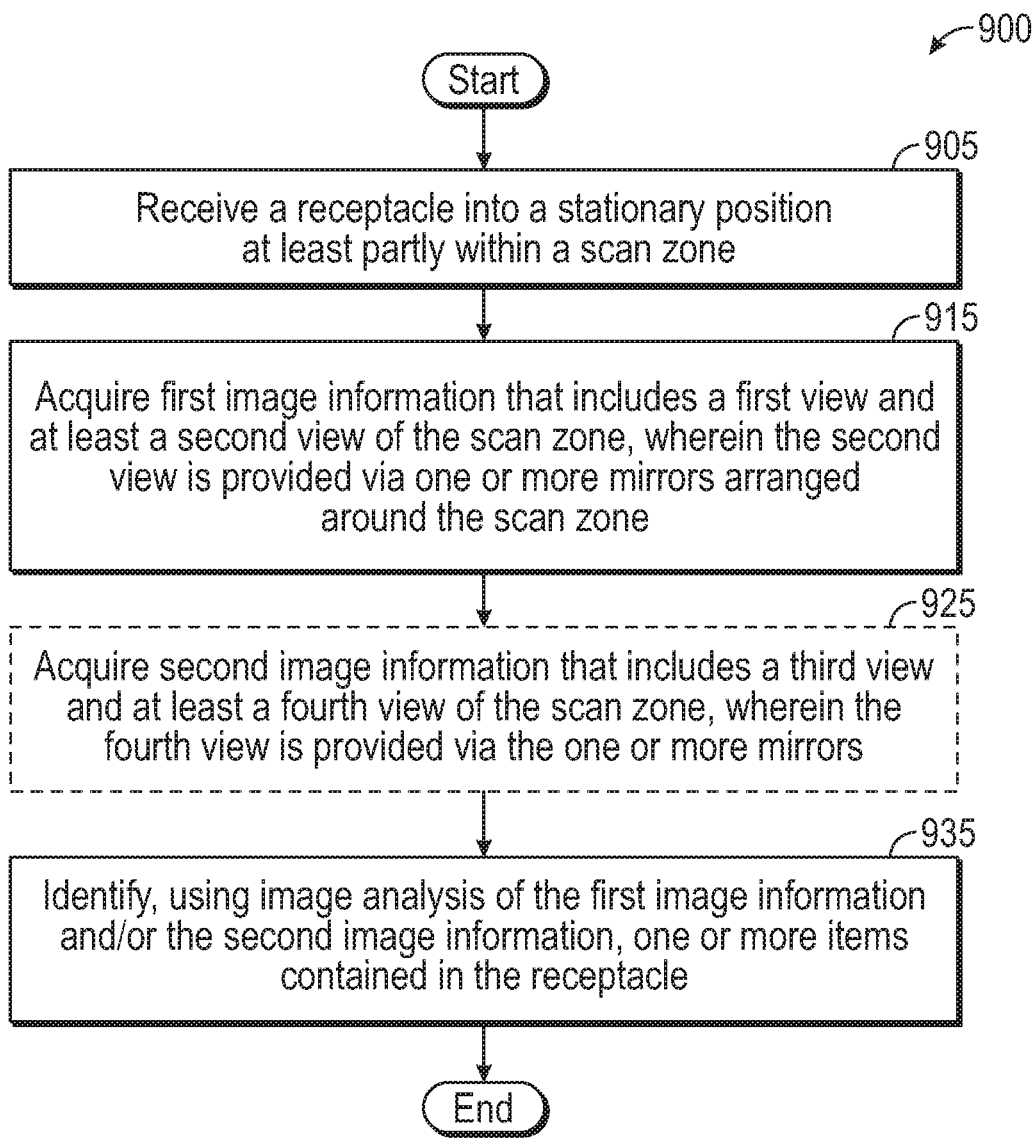
FIG. 9 is an exemplary method of identifying items at a POS terminal, according to one or more embodiments.

FIG. 9 is an exemplary method 900 of identifying items at a POS terminal, according to one or more embodiments. The method 900 may be used in conjunction with other embodiments discussed herein.

The method 900 begins at block 905, where a receptacle is received into a stationary position at least partly within a scan zone. The receptacle contains one or more items. In some embodiments, the scan zone is arranged proximately to a surface of the POS terminal.

At block 915, first image information is acquired that includes a first view and at least a second view of the scan zone. The second view is provided via one or more mirrors arranged around the scan zone. The first image information is acquired using a visual sensor having a predefined disposition relative to the surface of the POS terminal. The second view includes a view of the one or more items relative to a surface of the receptacle. In some embodiments, the second view includes a view of the one or more items through an exterior surface of the receptacle (e.g., through openings and/or a substantially optically transmissive material). In some embodiments, the second view is provided by one or more mirrors disposed at an interior surface of the receptacle.

At block 925, second image information is acquired that includes a third view and at least a fourth view of the scan zone. The fourth view is provided via the one or more mirrors. The second image information is acquired using a second visual sensor proximately disposed to the first visual sensor. At block 935, image analysis of the first image information and/or the second image information is used to identify one or more items contained in the receptacle. The method 900 ends following completion of block 935.

Figure 10:
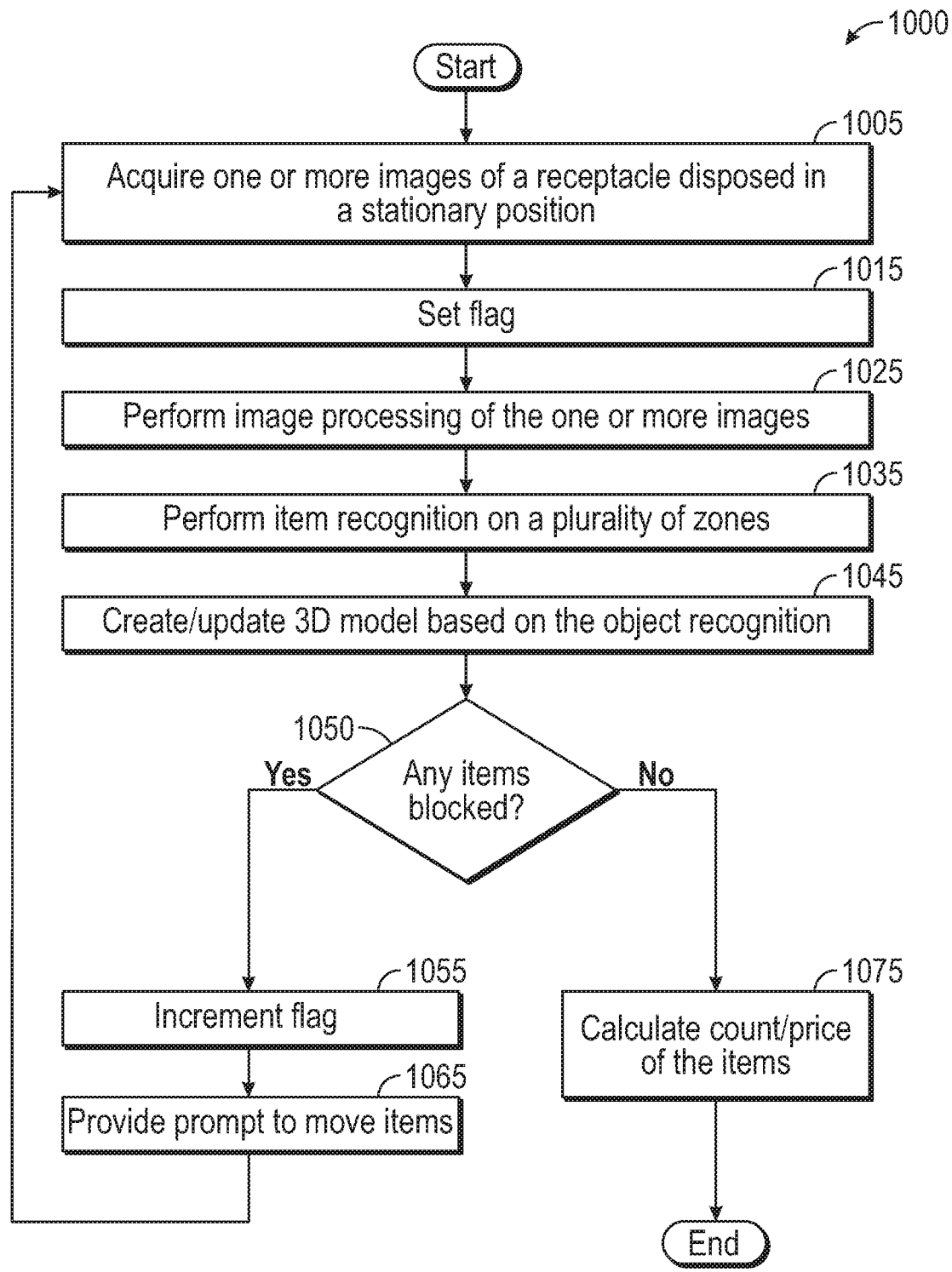
FIG. 10 is an exemplary method of completing a purchase transaction at a POS terminal, according to one or more embodiments.

FIG. 10 is an exemplary method 1000 of completing a purchase transaction at a POS terminal, according to one or more embodiments. The method 1000 may be used in conjunction with other embodiments discussed herein, such as part of method 900.

The method 1000 begins at block 1005, where one or more images are acquired of a receptacle disposed in a stationary position. The receptacle contains one or more items. In some embodiments, the block 1005 overlaps with block 915 and/or block 925 of method 900.

At block 1015, a flag is set to an initial value (e.g., 1). At block 1025, image processing is performed on the one or more images. In some embodiments, the image processing comprises (i) dividing the one or more images into a plurality of zones, (ii) reorienting portions of the one or more images corresponding to one or more of the plurality of zones, and/or (iii) reshaping portions of the one or more images. For example, using an acquired image corresponding to the top view 425 of FIG. 4B, the image may be divided into five (5) zones: a top view zone corresponding to the exposed portion of the surface 245, and four lateral view zones corresponding to the lateral views 430-1, 430-2, 430-3, 430-4. Portions of the image corresponding to the top view zone and/or one or more of the lateral view zones may be reoriented to provide a desired placement of the items contained in the receptacle. Portions of the image corresponding to the top view zone and/or one or more of the lateral view zones may be reshaped. For example, the trapezoidal-shaped lateral view zones may be reshaped into rectangular shapes (similar to the rectangular shape of the top view zone).

At block 1035, item recognition is performed on the plurality of zones. At block 1045, a three-dimensional (3D) model is created or updated based on the object recognition. At block 1050, the POS terminal determines whether any of the items contained in the receptacle are blocked or obscured. In some embodiments, the determination is based on a confidence level of identifying an item being less than a threshold. If any of the items are determined to be blocked ("YES"), the method 1000 proceeds to block 1055 and the flag value is incremented. At block 1065, a prompt is provided to move one or more of the items. In some embodiments, the prompt is provided to a customer using a visual display of the POS terminal. The method 1000 returns to block 1005, where one or more images are acquired.

If no items are determined to be blocked ("NO"), the method 1000 proceeds from block 1050 to block 1075, where a count and/or price of the items are calculated. The method 1000 ends following completion of block 1075.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A point-of-sale (POS) terminal comprising:
    a surface having a predefined scan zone arranged proximately thereto, wherein the scan zone is dimensioned to at least partly receive a receptacle containing one or more items;
    a first visual sensor having a predefined disposition relative to the surface, wherein a first field of view of the first visual sensor includes a direct first view of the scan zone;
    one or more mirrors disposed near the surface, wherein the one or more mirrors are arranged around the scan zone to provide at least an indirect second view of the scan zone within the first field of view, and wherein when the receptacle is disposed in a stationary position in the scan zone, the second view includes a view of the one or more items relative to a surface of the receptacle; and
    one or more computer processors configured to identify the one or more items using image analysis of first image information acquired by the first visual sensor.

2. The POS terminal of claim 1, wherein the second view includes a view of the one or more items through an exterior surface of the receptacle.

3. The POS terminal of claim 2, wherein the receptacle is formed of a substantially optically transmissive material.

4. The POS terminal of claim 1, further comprising:
    a second visual sensor proximately disposed to the first visual sensor, wherein a second field of view of the second visual sensor includes a third view of the scan zone and at least a fourth view of the scan zone via the one or more mirrors,
    wherein identifying the one or more items further uses image analysis of second image information acquired by the second visual sensor.

5. The POS terminal of claim 1, wherein the one or more mirrors comprise a plurality of mirrors each providing a respective view of the scan zone.

6. The POS terminal of claim 1, wherein the one or more mirrors comprise a single mirror that at least partly circumscribes the scan zone.

7. The POS terminal of claim 6, wherein the single mirror has one of a frustoconical shape and a frustopyramidal shape.

8. The POS terminal of claim 1, further comprising:
    one or more physical features defined relative to the surface and arranged to dispose the receptacle in the stationary position.

9. The POS terminal of claim 8, wherein the one or more physical features comprise an opening formed in the surface, and
    wherein the opening is dimensioned to at least partly receive the receptacle.

10. The POS terminal of claim 1, wherein the first view of the scan zone comprises a top view of the receptacle.

11. The POS terminal of claim 1, wherein the one or more mirrors are disposed at an interior surface of the receptacle.

12. The POS terminal of claim 1, wherein the one or more mirrors are attached to the surface.

13. A method comprising:
    receiving a receptacle into a stationary position within a scan zone arranged proximately to a surface, the receptacle containing one or more items;
    acquiring, using a first visual sensor having a predefined disposition relative to the surface, first image information that includes a direct first view and at least an indirect second view of the scan zone, wherein the second view is provided via a first mirror of one or more mirrors disposed near the surface and arranged around the scan zone, wherein the second view includes a view of the one or more items relative to a surface of the receptacle; and
    identifying, using image analysis of the first image information, the one or more items.

14. The method of claim 13, wherein the second view includes a view of the one or more items through an exterior surface of the receptacle.

15. The method of claim 14, wherein the receptacle is formed of a substantially optically transmissive material.

16. The method of claim 13, wherein receiving the receptacle into the stationary position comprises placing the receptacle onto the surface.

17. The method of claim 13, wherein the first view of the scan zone comprises a top view of the receptacle.

18. The method of claim 13, further comprising:
acquiring, using a second visual sensor proximately disposed to the first visual sensor, second image information that includes a third view of the scan zone and at least a fourth view of the scan zone via the one or more mirrors,
wherein identifying the one or more items further uses image analysis of the second image information.

19. The POS terminal of claim 1,
wherein the first view of the scan zone is a top view, and
wherein the one or more mirrors provide a plurality of lateral views of the scan zone within the first field of view.

20. The POS terminal of claim 19, wherein the second view includes a view of the one or more items through an exterior surface of the receptacle.

\* \* \* \* \*